United States Patent
Wang et al.

(10) Patent No.: US 12,482,139 B2
(45) Date of Patent: Nov. 25, 2025

(54) IMAGE COMPRESSION METHOD AND APPARATUS, AND INTELLIGENT TERMINAL AND COMPUTER-READABLE STORAGE MEDIUM

(71) Applicant: SHENZHEN TCL DIGITAL TECHNOLOGY LTD., Shenzhen (CN)

(72) Inventors: Jie Wang, Shenzhen (CN); Daxue Xia, Shenzhen (CN)

(73) Assignee: SHENZHEN TCL DIGITAL TECHNOLOGY LTD., Guangdong (CN)

(*) Notice: Subject to any disclaimer, the term of this patent is extended or adjusted under 35 U.S.C. 154(b) by 337 days.

(21) Appl. No.: 18/035,328

(22) PCT Filed: Oct. 29, 2021

(86) PCT No.: PCT/CN2021/127400
§ 371 (c)(1),
(2) Date: May 4, 2023

(87) PCT Pub. No.: WO2022/095797
PCT Pub. Date: May 12, 2022

(65) Prior Publication Data
US 2024/0104780 A1 Mar. 28, 2024

(30) Foreign Application Priority Data
Nov. 6, 2020 (CN) .......... 202011229822.9

(51) Int. Cl.
G06V 10/00 (2022.01)
G06T 9/00 (2006.01)
G06V 10/75 (2022.01)

(52) U.S. Cl.
CPC .............. G06T 9/00 (2013.01); G06V 10/751 (2022.01)

(58) Field of Classification Search
CPC .... H04N 19/182; H04N 19/105; H04N 19/11; H04N 19/42; H04N 19/44; H04N 19/46;
(Continued)

(56) References Cited

U.S. PATENT DOCUMENTS 5,402,146 A * 3/1995 Rodriguez .......... H04N 5/9261
375/E7.211
5,915,042 A 6/1999 Matsushiro
(Continued)

FOREIGN PATENT DOCUMENTS

CN 102823244 A 12/2012
CN 103179384 A 6/2013
(Continued)

OTHER PUBLICATIONS

International Search Report in International application No. PCT/CN2021/127400, mailed on Dec. 30, 2021.
(Continued)

*Primary Examiner* — Amir Alavi
(74) *Attorney, Agent, or Firm* — PV IP PC; Wei Te Chung (57) ABSTRACT

Disclosed are an image compression method and apparatus, and an intelligent terminal and a computer-readable storage medium. The method comprises: obtaining a target image, and determining reference pixel points corresponding to target pixel points; determining pixel difference values of the target pixel points and the reference pixel points corresponding to same; determining, according to the pixel difference values, point compression data corresponding to the target pixel points; and compressing the target pixel points according to the point compression data to obtain image compression data of the target image.

17 Claims, 2 Drawing Sheets

(58) Field of Classification Search
CPC ...... H04N 19/593; H04N 11/046; G06T 9/00; H04L 69/04; G06V 10/82; G06V 10/751
See application file for complete search history.

(56) References Cited

U.S. PATENT DOCUMENTS

| | | | | |
|---|---|---|---|---|
| 7,421,132 | B2* | 9/2008 | Okada | H04N 19/593 |
| | | | | 382/233 |
| 8,036,281 | B2* | 10/2011 | Kobayashi | H04N 23/6811 |
| | | | | 375/240.26 |
| 8,515,166 | B2* | 8/2013 | Ha | H04N 19/103 |
| | | | | 382/232 |
| 8,768,085 | B2* | 7/2014 | Liang | H04N 19/61 |
| | | | | 382/248 |
| 10,560,703 | B2* | 2/2020 | Liu | H04N 19/91 |
| 10,931,970 | B2* | 2/2021 | Jeon | H04N 19/117 |
| 11,711,541 | B2* | 7/2023 | Lee | H04N 19/159 |
| | | | | 375/240.12 |
| 12,094,090 | B2* | 9/2024 | Chen | G06T 5/70 |
| 12,244,853 | B2* | 3/2025 | Ko | H04N 19/11 |
| 12,262,002 | B2* | 3/2025 | Kim | H04N 19/105 |
| 2014/0093181 | A1* | 4/2014 | Nakayama | G06T 9/008 |
| | | | | 382/233 |
| 2014/0362917 | A1 | 12/2014 | Joshi et al. | |

FOREIGN PATENT DOCUMENTS

| | | |
|---|---|---|
| CN | 105933708 A | 9/2016 |
| CN | 106231214 A | 12/2016 |
| CN | 106231322 A | 12/2016 |
| CN | 107659815 A | 2/2018 |
| CN | 110557637 A | 12/2019 |
| CN | 110971904 A | 4/2020 |
| EP | 2202983 A1 | 6/2010 |
| JP | 2000299866 A | 10/2000 |
| JP | 2007295023 A | 11/2007 |
| JP | 5108828 B2 | 12/2012 |

OTHER PUBLICATIONS

Written Opinion of the International Search Authority in International application No. PCT/CN2021/127400, mailed on Dec. 30, 2021.
European Search Report in European application No. 21888494.8, mailed on Jul. 16, 2024.
Yun Q Shi et al: "Image and Video Compression for Multimedia Engineering", Jan. 1, 2000 (Jan. 1, 2000), Image and Video Compression for Muitimedia Engineering: Fundamentals, Algorithms, and Standards; [Image Processing Series], Boca Raton, Fla. [U.A]: CRC Press [U.A], USA, pp. 55-60, XP002520644.
Anonymous: "how to delete first row of pixel values?—MATLAB Answers—MATLAB Central", Oct. 31, 2014 (Oct. 31, 2014), pp. 1-4, XP093181552.
Chinese Office Action issued in corresponding Chinese Patent Application No. 202011229822.9 dated Dec. 31, 2024, pp. 1-10.

* cited by examiner

IMAGE COMPRESSION METHOD AND APPARATUS, AND INTELLIGENT TERMINAL AND COMPUTER-READABLE STORAGE MEDIUM

This application claims the benefits of International Application No. PCT/CN2021/127400, filed on Oct. 29, 2021, which claims priority to Chinese Application No. 202011229822.9, filed on Nov. 6, 2020. The entire disclosures of each of the applications are incorporated herein by reference.

TECHNICAL FIELD

The present invention relates to the image processing technical field, and more particularly to an image compression method and apparatus, and an intelligent terminal and a computer-readable storage medium.

DESCRIPTION OF RELATED ARTS

As bit depth of images becomes larger and larger, as well as image resolution becomes higher and higher, bandwidth requirement gradually increases for image transmission. For example, the bandwidth of an image with 4K@60 hz (30-bit bit depth) has reached 14 Gb/s. Therefore, to ensure the image to be completely transmitted, a higher bandwidth requirement is needed at the transmission end. Since raw image data are large, the image is usually compressed by certain compression means to relieve pressure of the bandwidth during the transmission.

However, most of the image compression methods adopted in prior arts to relieve pressure of the bandwidth are to compress the image at the expense of image resolution or bit depth, which improve transmission efficiency, but the original image is destroyed and it is not truly lossless compression.

Technical Problems

The present invention provides an image compression method and apparatus, and an intelligent terminal and a computer-readable storage medium, which can solve the technical problem that the existing image compression techniques cannot realize a relief of pressure of the bandwidth without sacrificing the image resolution and bit depth.

Technical Solutions

In a first aspect, the present invention provides an image compression method, which includes:
  obtaining a target image, and determining a reference pixel point corresponding to each target pixel point in the target image;
  for each target pixel point, determining a pixel difference value between the target pixel point and the reference pixel point corresponding to the target pixel point;
  determining point compression data corresponding to each target pixel point according to the pixel difference value corresponding to each target pixel point; and
  compressing each target pixel point according to the point compression data corresponding to each target pixel point to obtain image compression data of the target image.

In a second aspect, the present invention provides an image compression apparatus, which includes:
  a selecting module, for obtaining a target image, and determining a reference pixel point corresponding to each target pixel point in the target image;
  a difference value calculating module, for determining a pixel difference value between the target pixel point and the reference pixel point corresponding to the target pixel point for each target pixel point;
  a compression determining module, for determining point compression data corresponding to each target pixel point according to the pixel difference value corresponding to each target pixel point; and
  a generating module, for compressing each target pixel point according to the point compression data corresponding to each target pixel point to obtain image compression data of the target image.

In a third aspect, the present invention further provides an intelligent terminal, including a storage, a processor and an image compression program stored in the storage and executable by the processor, wherein the image compression program is executed by the processor to perform the steps of:
  obtaining a target image, and determining a reference pixel point corresponding to each target pixel point in the target image;
  for each target pixel point, determining a pixel difference value between the target pixel point and the reference pixel point corresponding to the target pixel point;
  determining point compression data corresponding to each target pixel point according to the pixel difference value corresponding to each target pixel point; and
  compressing each target pixel point according to the point compression data corresponding to each target pixel point to obtain image compression data of the target image.

In a fourth aspect, the present invention further provides a computer-readable storage medium, storing an image compression program, which is executed by a processor to perform the steps of:
  obtaining a target image, and determining a reference pixel point corresponding to each target pixel point in the target image;
  for each target pixel point, determining a pixel difference value between the target pixel point and the reference pixel point corresponding to the target pixel point;
  determining point compression data corresponding to each target pixel point according to the pixel difference value corresponding to each target pixel point; and
  compressing each target pixel point according to the point compression data corresponding to each target pixel point to obtain image compression data of the target image.

Beneficial Effects

The present invention discloses an image compression method and apparatus, an intelligent terminal, and a computer-readable storage medium. The image compression method includes obtaining a target image, and determining a reference pixel point corresponding to each target pixel point in the target image; for each target pixel point, determining a pixel difference value between the target pixel point and the reference pixel point corresponding to the target pixel point; determining point compression data corresponding to each target pixel point according to the pixel difference value corresponding to each target pixel point; and compressing each target pixel point according to the point compression data corresponding to each target pixel point to obtain image compression data of the target image.

The present invention intends to transmit the compressed data with the pixel difference value when the difference value between the pixel value and the reference value of the target pixel point falls within the preset compression threshold range. This greatly reduces the amount of transmitted data and improves compression rate without losing the image resolution and bit depth, and the original image is completely restored, enhancing the convenience for the user.

DETAILED DESCRIPTION

To make the objectives, technical schemes, and effects of the present invention more clear and specific, the present invention is described in further detail below with reference to the embodiments in accompanying with the appending drawings. It should be understood that the specific embodiments described herein are merely for interpreting the present invention and the present invention is not limited thereto.

Figure 1:
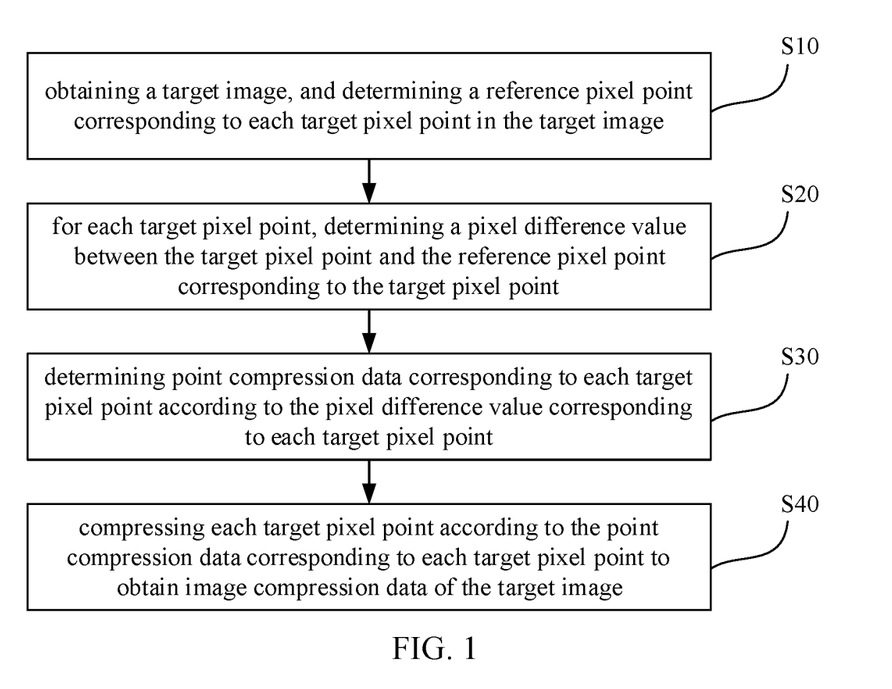
FIG. 1 is a flowchart of an image compression method provided according to the present invention.

Referring to FIG. 1, which is a flowchart of an image compression method provided according to the present invention. It should be noted that the image compression method in accordance with embodiments of the present invention is not limited to the steps and order as illustrated in the flowchart shown in FIG. 1, and addition, or removal, or a change of the order may be applied to the steps in the flowchart according to different needs.

As shown in FIG. 1, the image compression method provided according to the present invention includes the following steps.

In S10, the intelligent terminal obtains a target image and determines a reference pixel point corresponding to each target pixel point in the target image.

Specifically, the target image can be a complete image, a single frame among image frames, or an image with multiple frames. For example, the target image is an image frame in a video. If the target image is a single image which is an image composed of multiple image frames, the compression method applied to the target image can be considered as gathering the compression applied to the image frames one by one. The target image is captured by an image capturing module, which can be a camera or its components. After the target image is captured, it is cached for subsequent image compression and decoding. In the present embodiment, the technical solution of this application is illustrated by taking one image frame as the target image. Thus, the target image includes a plurality of target pixel points, and each target pixel point has a pixel value and corresponding coordinate information. If a coordinate system is established for the target image, the coordinates of any target pixel point are represented by a two-dimensional matrix (Xm, Yn) in the present embodiment. For example, (X1, Y2) indicates the horizontal and vertical coordinates of a target pixel point, i.e., the 1st row and the 2nd column of the target image.

A reference pixel point is a certain target pixel point in the target image, and there may have one or more than one reference pixel points. The reference pixel points are used to determine what transfer mode is invoked for all the target pixel points in the target image to be transmitted during the image transferring. That is, all the target pixel points other than the reference pixel points are compared with the reference pixel points which are taken as a benchmark to determine whether the transmission is carried out in a compressed form or in a raw (e.g., uncompressed) form to reduce the amount of transmitted data of the target image based on the adopted compressed transmission.

In the present embodiment, a selection of the reference pixel point can be classified into three categories, namely, a row pixel point, a column pixel point, and a mixed pixel point. A row reference pixel point refers to a target pixel point that is taken as a reference pixel point in a same row, that is, the vertical coordinates of the target pixel points are equal. A column reference pixel point refers to a target pixel point that is taken as a reference pixel point in a same column, that is, the horizontal coordinates of the target pixel points are equal. A mixed reference pixel point is directed to a certain target pixel point.

It should be noted that the reference pixel points are taken as starting points for the target image to perform the image compression method, and then compression and transmission of the image proceed sequentially based on certain rules.

For example, if a selected reference pixel point is the row reference pixel point, the image is compressed row by row. During the image transmission, the image compression is performed on the first row, and after that, the image compression is performed on the second row, and so on, until the image compression performed on the last row is finished.

If a selected reference pixel point is the column reference pixel point, the image is compressed column by column. During the image transmission, the image compression is performed on the first column, and after that, the image compression is performed on the second column, and so on, until the image compression performed on the last column is finished.

If a selected reference pixel point is the mixed reference pixel point, the image is compressed one target pixel point by one target pixel point. During the image transmission, it needs to define a way of transmission in advance, and a compression mode of each target pixel point is determined according to the predefined way of transmission for ease of storage and restoration.

For example, if the way of transmission is determined to be transmitted from odd and even rows (the odd rows first, then the even rows), the image compression is performed from a pixel at first row first column, and after it is finished for a pixel at first row last column, the image compression is performed from a pixel at third row first column and is ended at a pixel at third row last column, and so on, until the image compression is performed from a pixel at last odd row first column and is ended at a pixel at last column, and then the image compression is performed from a pixel at second row first column, and after it is finished for a pixel at second row last column, the image compression is performed from a pixel at fourth row first column and is ended at a pixel at fourth row last column, and so on, until the image compression is performed from a pixel at last even row first column and is ended at a pixel at last column.

For purpose of illustration, the determining the reference pixel point corresponding to each target pixel point in the target image by the intelligent terminal includes:

selecting, by the intelligent terminal, the target pixel point in the first column of each row from the target image as the reference pixel point of remaining target pixel points in that row; or selecting the target pixel point in the first row of each column from the target image as the reference pixel point of remaining target pixel points in that column; or selecting any target pixel point from the target image as the reference pixel point of remaining target pixel points.

In S20, for each target pixel point, the intelligent terminal determines a pixel difference value between the target pixel point and the reference pixel point corresponding to the target pixel point;

Based on Step S10, there are three types of reference pixel points, and correspondingly there are three types of pixel difference calculations, which are:

1. The reference pixel point includes a row reference pixel point, and the determining, by the intelligent terminal, the pixel difference value between the target pixel point and the reference pixel point corresponding to the target pixel point for each target pixel point includes:

taking, by the intelligent terminal, the target pixel point in the first column of each row in the target image as the row reference pixel point, and obtaining a first pixel value of the row reference pixel point;

obtaining second pixel values of all the target pixel points in remaining columns for a same row where the row reference pixel point is located; and subtracting the first pixel value from the second pixel values to obtain row pixel difference values between the row reference pixel point and all the target pixel points in the remaining columns.

That is, the target pixel point in the first column of each row in the target image serves as the row reference pixel point, and difference calculations are made based on the second pixel values of the target pixel points in the remaining columns of that row and the first pixel value of the row reference pixel point in the row where the row reference pixel point is located. This is expressed as: the row pixel difference value=the second pixel value-the first pixel value. Likewise:

2. The reference pixel point includes a column reference pixel point, and the determining, by the intelligent terminal, the pixel difference value between the target pixel point and the reference pixel point corresponding to the target pixel point for each target pixel point includes:

taking, by the intelligent terminal, the target pixel point in the first row of each column in the target image as the column reference pixel point, and obtaining a third pixel value of the column reference pixel point;

obtaining fourth pixel values of all the target pixel points in remaining rows for a same column where the column reference pixel point is located; and subtracting the third pixel value from the fourth pixel values to obtain column pixel difference values between the column reference pixel point and all the target pixel points in the remaining rows.

That is, the target pixel point in the first row of each column in the target image serves as the column reference pixel point, and difference calculations are made based on the fourth pixel values of the target pixel points in the remaining rows of that column and the third pixel value of the column reference pixel point in the column where the column reference pixel point is located. This is expressed as: the column pixel difference value=the fourth pixel value-the third pixel value. Likewise:

3. The reference pixel point includes a mixed reference pixel point, and the determining the pixel difference value between the target pixel point and the reference pixel point corresponding to the target pixel point for each target pixel point includes:

taking any target pixel point in the target image as the mixed reference pixel point, and obtaining a fifth pixel value of the mixed reference pixel point;

obtaining sixth pixel values of all of remaining target pixel points in the target image; and subtracting the fifth pixel value from the sixth pixel values to obtain mixed pixel difference values between the mixed reference pixel point and all the remaining target pixel points.

This is, the mixed pixel difference value=the sixth pixel value-the fifth pixel value.

Positive and negative values may coexist for the row pixel difference values, the column pixel difference values or the mixed pixel difference values. However, this will not affect the image compression.

In S30, the intelligent terminal determines point compression data corresponding to each target pixel point according to the pixel difference value corresponding to each target pixel point.

Specifically, a preset compression threshold range is an interval such as (−16,16). The preset compression threshold range is used to indicate what kind of the way to deliver the pixel values of the target pixel points. Furthermore, judging whether the pixel difference value of each target pixel point falls within the predetermined compression threshold range can further determine whether the compression is activated or not for the target pixel point.

In the present embodiment, if the comparison result shows that the pixel difference value of the target pixel point exceeds the preset compression threshold range, the compression is not performed on the target pixel point, and its original value serves as first point compression data of the target pixel point; and if the comparison result shows that the pixel difference value of the target pixel point falls within the preset compression threshold range, the compression is performed on the target pixel point, and the pixel difference value serves as second point compression data of the target pixel point. The compression is not performed on the target pixel point that serves as the reference pixel point, and its original value serves as third point compression data.

The number of bits of the second point compression data is less than the number of bits of the first point compression data or the third point compression data.

Further, the highest bit of any of the point compression data is used as a compression flag bit for indicating whether the compression is activated or not. That is, the highest bit of the data structure of the point compression data is a bit of compression standard, and a certain number of remaining lower bits are used to indicate the pixel values, i.e., R, G, and B values.

If 32 bits are involved in image transmission, it indicates that the pixel value of each target pixel point has 32 bits, that is, the original value of each target pixel point has 32 bits. Therefore, if the compression is not performed, that is, the compression is not activated, the original value serves as the point compression data and specifically, 32-bit data of each target pixel point are transmitted and buffered. In the present embodiment, the point compression data are typically binary data.

Further, the highest bit is the compression flag bit. When the compression flag bit is 1, it indicates that the compression is activated for the target pixel point, and the difference value serves as the point compression data. When the compression flag bit is 0, it indicates that the compression is not activated for the target pixel point, and the original value serves as the point compression data.

Further, for the target pixel point that serves as the reference pixel point, the original value is used as the point compression data for ease of providing a reference for subsequent decoding (i.e., restoration) of the image.

Further, the difference value of the target pixel point serves as the second point compression data. In the present embodiment, the data structure of the second point compression data also utilizes the highest bit as the compression flag bit, but it indicates the compression is activated when the compression flag bit is 1. The number of data bits of the second point compression data is preferably 16 in the present embodiment. Since the number of data bits of the second point compression data (i.e., 16) is much less than the number of data bits corresponding to the original value (i.e., 32), the image compression process greatly reduces the amount of data and improves compression rate while the pressure on bandwidth is reduced and the efficiency of transmission is improved.

To facilitate the understanding of Step S30, it is illustrated using a specific embodiment, as follows.

Original values corresponding to the first row of the image:

TABLE 1

| First column | | | | ... | n-th column | | | |
|---|---|---|---|---|---|---|---|---|
| 32 bit | 31-17 bit | 16 bit | 15-1 bit | ... | 32 bit | 31-17 bit | 16 bit | 15-1 bit |
| Reserved 0 | R [9:0], G [9:5] | Reserved 0 | G [4:0], B [9:0] | ... | Reserved 0 | R [9:0], G [9:5] | Reserved 0 | G [4:0], B [9:0] |

Compression values corresponding to the first row of the compressed image:

TABLE 2

| First column | | | | ... | (n-1)-th column | | n-th column | |
|---|---|---|---|---|---|---|---|---|
| 32 bit | 31-17 bit | 16 bit | 15-1 bit | ... | 32 bit | 31-17 bit | 16 bit | 15-1 bite |
| 0 | R [9:0], G [9:5] | 0 | G [4:0], B [9:0] | ... | 1 | R [4:0], G [4:0, B [4:0] | 1 | R [4:0], G [4:0, B [4:0] |

In Tables 1 and 2, the row reference value is taken from the first column of each row of the target image, and the remaining columns are compared with the row reference value. The original target pixel points in Table 1 are illustrated by taking 10 bits for each of R, G and B as an example, and each pixel occupies 32 bits. Before the compression, the 32nd bit and the 16th bit of each original target pixel point is kept unused (0). Then, an encoding module (e.g., an encoder) reads a row in the target image and takes the pixel positions (i.e., the 32nd-bit position and the 16th-bit position as the compression flag bits for indicating whether the pixel is compressed. As shown in Table 2, if the compression is activated, that is, the flag is 1, a pixel point is represented by every 16 bits, wherein R, G and B each occupies 5 bits, and the highest bit of R, G, B represents the difference value is positive or negative. If the compression is not activated, it is the same as the original pixel, and a pixel point is represented by 32 bits.

Then the pixel at the first column of that row is transmitted using the original pixel, which serves as the row reference value. The image size is 32 bits. The remaining columns are compared with the first column to obtain the difference values. If the difference value is within (plus or minus) 16, the transmission proceeds with the difference value. Then, this target pixel point occupies an image size of 16 bits.

In S40, the intelligent terminal compresses each target pixel point according to the point compression data corresponding to each target pixel point to obtain image compression data of the target image.

Specifically, the third point compression data of the reference pixel point and the first point compression data and/or the second point compression data of remaining target pixel points are obtained, and the third point compression data, and the first point compression data and/or the second point compression data are gathered to obtain the image compression data of the target image.

That is, according to the transmission convention, an aggregation of the point compression data of each target pixel point is the image compression data of the target image. The image compression data is also binary data.

Figure 2:
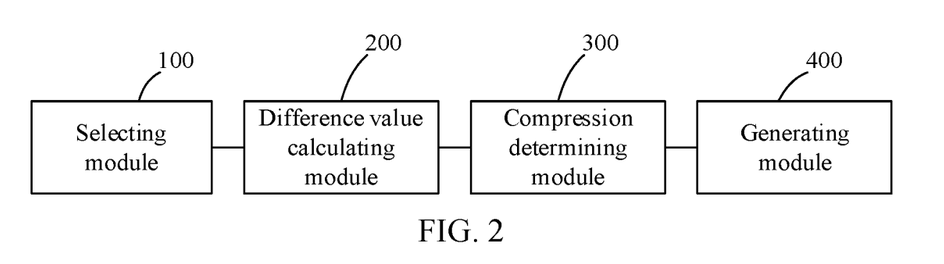
FIG. 2 is a functional block diagram illustrating an image compression apparatus provided according to the present invention.

Based on above method, the present application also provides an image compression apparatus, as shown in FIG. 2, which is a functional block diagram illustrating an image compression apparatus provided according to the present invention. The compression apparatus includes:

a selecting module 100, for obtaining a target image, and determining a reference pixel point corresponding to each target pixel point in the target image;

a difference value calculating module 200, for determining a pixel difference value between the target pixel point and the reference pixel point corresponding to the target pixel point for each target pixel point;

a compression determining module 300, for determining point compression data corresponding to each target pixel point according to the pixel difference value corresponding to each target pixel point; and a generating module 400, for compressing each target pixel point according to the point compression data corresponding to each target pixel point to obtain image compression data of the target image.

Further, the selecting module is further for: selecting the target pixel point in the first column of each row from the target image as the reference pixel point of remaining target pixel points in that row; or selecting the target pixel point in the first row of each column from the target image as the reference pixel point of remaining target pixel points in that column; or selecting any target pixel point from the target image as the reference pixel point of remaining target pixel points.

Further, the difference value calculating module is further for: for each target pixel point, obtaining pixel values of the target pixel point and the reference pixel point corresponding to the target pixel point; and subtracting the pixel value of the reference pixel point corresponding to the target pixel point from the target pixel point to obtain the pixel difference value corresponding to the target pixel point.

Further, the compression determining module is further for: comparing the pixel difference value corresponding to each target pixel point with a preset compression threshold range; if the pixel difference value of a certain target pixel point does not fall within the preset compression threshold range, compressing the certain target pixel point using a way with an original value involved to obtain first point compression data corresponding to the certain target pixel point; or if the pixel difference value of a certain target pixel point falls within the preset compression threshold range, compressing the certain target pixel point using a way with a difference value involved to obtain second point compression data corresponding to the certain target pixel point.

Further, the compression device is further for: using a way with the original value involved to compress the reference pixel point corresponding to each target pixel point to obtain third point compression data corresponding to the reference pixel point, wherein compression is not performed on the target pixel point that serves as the reference pixel point.

Further, the generating module is further for: obtaining the third point compression data of the reference pixel point corresponding to each target pixel point, and the first point compression data or the second point compression data corresponding to each target pixel point; and based on the third point compression data, the second point compression data and the first point compression data, compressing each target pixel point and the reference pixel point corresponding to the target pixel point to obtain the image compression data of the target image.

Further, data length of the second point compression data is less than data length of the first point compression data.

Further, data length of the second point compression data is less than data length of the third point compression data.

Further, the highest bit of any of the point compression data is used as a compression flag bit for indicating whether compression is activated or not.

Figure 3:
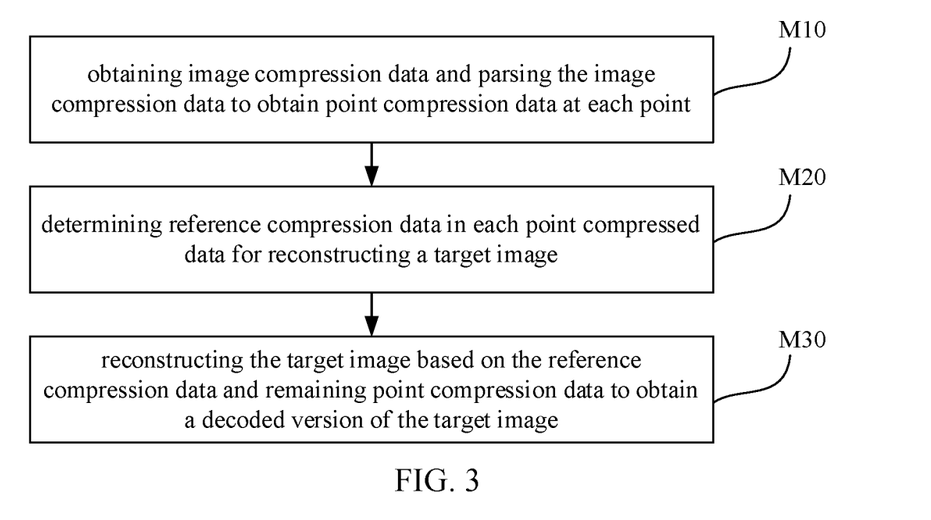
FIG. 3 is a flowchart of an image decoding method provided according to the present invention.

Based on above method, the present application also provides an image decoding method. Please refer to FIG. 3, which is a flowchart of an image decoding method provided according to the present invention. It should be noted that the image decoding method in accordance with embodiments of the present invention is not limited to the steps and order as illustrated in the flowchart shown in FIG. 3, and addition, or removal, or a change of the order may be applied to the steps in the flowchart according to different needs. As shown in FIG. 3, the image decoding method includes the following steps.

In M10, image compression data is obtained, the image compression data is parsed to obtain point compression data at each point.

In M20, reference compression data in each point compressed data for reconstructing a target image is determined.

In M30, the target image is reconstructed based on the reference compression data and remaining point compression data to obtain a decoded version of the target image.

Specifically, the highest bit in the data structure of the point compression data is used to indicate whether the compression is activated. When its value is 0, it indicates the compression is performed in an original way; and when its value is 1, it indicates the compression is performed in a way with the pixel difference value involved. In parsing the image compression data, a bit of compression standard is used to determine whether transmitted data bits are the data bits corresponding to the original value or the data bits corresponding to the difference value, and then the original pixel value of each target pixel point is restored based on the reference value of the reference pixel point. Of course, similar to the image compression method, the reference pixel points are also divided into 3 types, which are not repeated herein. The decompressed image is then re-cached as lossless compression image packets, i.e., restored to the original image.

For example, the first column of each image row is taken as the reference value for that row. The remaining columns are judged based on the convention, i.e., the compression flag bit. If the compression flag is valid, the original pixel point value is obtained by restoration based on the reference value. The decoded image obtained after decompression is re-cached to form lossless compression image packets.

Figure 4:
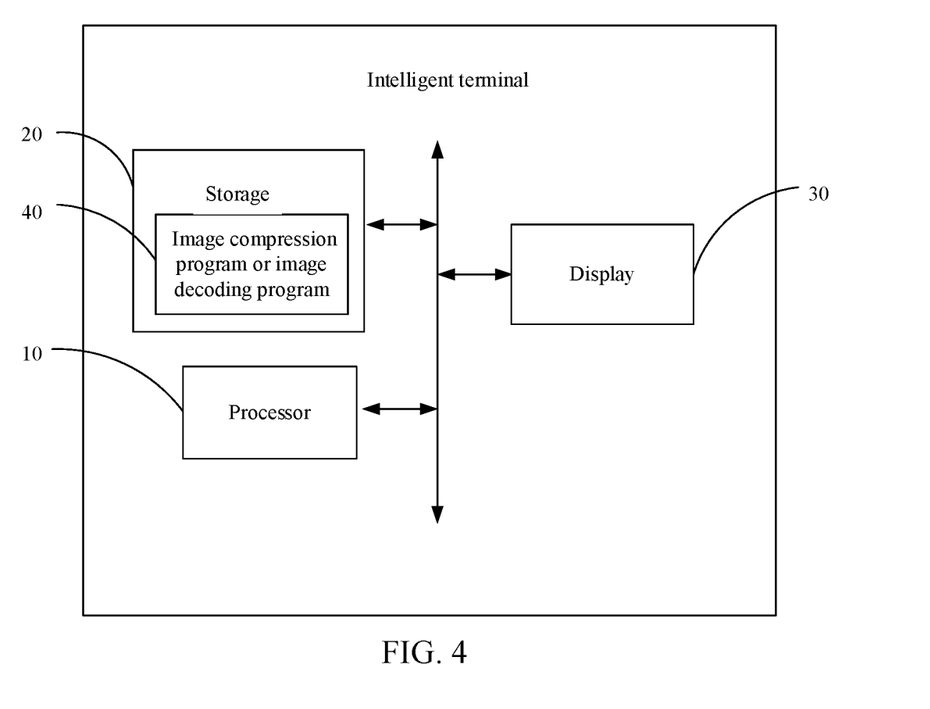
FIG. 4 is a structural block diagram illustrating an intelligent terminal provided according to the present invention.

In one embodiment, the present invention also provides an intelligent terminal, as shown in FIG. 4, which is a structural block diagram illustrating an intelligent terminal provided according to the present invention. The intelligent terminal includes a processor 10, a storage 20 and a display 30. FIG. 4 illustrates only some components of the intelligent terminal, but it should be understood that it is not required to implement all of the illustrated components, and more or fewer components may be implemented instead.

In some embodiments, the storage 20 can be an internal storage unit of the intelligent terminal, such as a hard disk or a memory of the intelligent terminal. In some other embodiments, the storage 20 may also be an external storage device of the intelligent terminal, such as a plug-in hard disk, a Smart Media Card (SMC), a Secure Digital (SD) and a Flash Card that are equipped in the intelligent terminal. Further, the storage 20 may also include both an internal storage unit and an external storage device of the intelligent terminal. The storage 20 is used to store application software installed in the intelligent terminal (e.g., program codes installed in the intelligent terminal) and various data. The storage 20 can also be used to temporarily store data that has been output or will be output. In an embodiment, an image compression program or an image decoding program 40 is stored in the storage 20, and the image compression program or the image decoding program 40 can be executed by the processor 10, thereby realizing the image compression method or the image decoding method in this application.

In some embodiments, the processor 10 may be a Central Processing Unit (CPU), a microprocessor or other data processing chip for running program codes stored in the storage 20 or processing data, e.g., performing the image compression method or the image decoding method.

In some embodiments, the display 30 can be a light-emitting diode (LED) display, a liquid crystal display (LCD), a touchscreen LCD, or an organic light-emitting diode (OLED) touch device, and the like. The display 30 is used to display information on the intelligent terminal as well as for displaying a visual user interface. The components 10 to 30 of the intelligent terminal communicate with each other via a system bus.

In an embodiment, the image compression program 40 in the storage 20 is executed by the processor 10 to perform the steps of:

obtaining a target image, and determining a reference pixel point corresponding to each target pixel point in the target image;

for each target pixel point, determining a pixel difference value between the target pixel point and the reference pixel point corresponding to the target pixel point;

determining point compression data corresponding to each target pixel point according to the pixel difference value corresponding to each target pixel point; and compressing each target pixel point according to the point compression data corresponding to each target pixel point to obtain image compression data of the target image. Please refer to the afore-described image compression method for details.

Alternatively, in another embodiment, the image decoding program 40 in the storage 20 is executed by the processor 10 to perform the steps of:

obtaining image compression data, and parsing the image compression data to obtain point compression data at each point;

determining reference compression data in each point compressed data for reconstructing a target image; and reconstructing the target image based on the reference compression data and remaining point compression data to obtain a decoded version of the target image. Please refer to the afore-described image decoding method for details.

The present invention also provides a computer-readable storage medium. The computer-readable storage medium stores an image compression program. The image compression program is executed by a processor (in this embodiment, the processor 10) to implement the steps in the image compression method of the present invention. Alternatively, the computer-readable storage medium stores an image decoding program. The image decoding program is executed by one or more processors (in this embodiment, the processor 10) to implement the steps in the image decoding method of the present invention. Please refer to the afore-described methods for details.

For example, the image compression program is executed by the processor (in this embodiment, the processor 10) for:

obtaining a target image, and determining a reference pixel point corresponding to each target pixel point in the target image;

for each target pixel point, determining a pixel difference value between the target pixel point and the reference pixel point corresponding to the target pixel point;

determining point compression data corresponding to each target pixel point according to the pixel difference value corresponding to each target pixel point; and compressing each target pixel point according to the point compression data corresponding to each target pixel point to obtain image compression data of the target image.

Those skilled in the art will appreciate that what are shown in FIG. 4 is only a block diagram illustrating partial structure associated with the technical solution of the present application and does not constitute a limitation of computer device to which the technical solution of the present application is applied, and that the intelligent terminal may include more or less components than that shown in the figures, or combine certain components, or have a different arrangement of the components. When executing a computer program, the processor implements the steps of the image compression method, as described above.

Above all, the present invention discloses the image compression method and apparatus, the intelligent terminal, and the computer-readable storage medium. The method includes obtaining a target image, and determining a reference pixel point corresponding to each target pixel point in the target image; for each target pixel point, determining a pixel difference value between the target pixel point and the reference pixel point corresponding to the target pixel point; determining point compression data corresponding to each target pixel point according to the pixel difference value corresponding to each target pixel point; and compressing each target pixel point according to the point compression data corresponding to each target pixel point to obtain image compression data of the target image. The present invention intends to transmit the compressed data with the pixel difference value when the difference value between the pixel value and the reference value of the target pixel point falls within the preset compression threshold range. This greatly reduces the amount of transmitted data and improves compression rate without losing the image resolution and bit depth, and the original image is completely restored, enhancing the convenience for the user.

Of course, a person of ordinary skill in the art may understand that all or some of the processes in the foregoing method embodiments may be implemented by a computer program instructing relevant hardware (e.g., a processor, a controller, and the like). The computer program may be stored in a computer-readable storage medium. When executed, the program may include the processes as described in the foregoing method embodiments. The storage medium may include a storage, a magnetic disk or an optic disc.

It should be understood that the applications of the present invention are not limited to above embodiments, and those of ordinary skill in the art may make improvements or variations according to above illustration, but all such improvements and variations should be within the appended claims of the present invention.

What is claimed is:

1. An image compression method, comprising:

obtaining a target image, and determining a reference pixel point corresponding to each target pixel point in the target image;

for each target pixel point, determining a pixel difference value between the target pixel point and the reference pixel point corresponding to the target pixel point;

determining point compression data corresponding to each target pixel point according to the pixel difference value corresponding to each target pixel point; and compressing each target pixel point according to the point compression data corresponding to each target pixel point to obtain image compression data of the target image;

wherein the determining the reference pixel point corresponding to each target pixel point in the target image comprises:

selecting the target pixel point in the first column of each row from the target image as the reference pixel point of remaining target pixel points in that row; or selecting the target pixel point in the first row of each column from the target image as the reference pixel point of remaining target pixel points in that column; or selecting any target pixel point from the target image as the reference pixel point of remaining target pixel points.

2. The method of claim 1, wherein the determining the pixel difference value between the target pixel point and the reference pixel point corresponding to the target pixel point for each target pixel point comprises:

for each target pixel point, obtaining pixel values of the target pixel point and the reference pixel point corresponding to the target pixel point; and subtracting the pixel value of the reference pixel point corresponding to the target pixel point from the target pixel point to obtain the pixel difference value corresponding to the target pixel point.

3. The method of claim 2, wherein the determining the point compression data corresponding to each target pixel point according to the pixel difference value corresponding to each target pixel point comprises:

comparing the pixel difference value corresponding to each target pixel point with a preset compression threshold range;

if the pixel difference value of a certain target pixel point does not fall within the preset compression threshold range, compressing the certain target pixel point using a way with an original value involved to obtain first point compression data corresponding to the certain target pixel point; and if the pixel difference value of a certain target pixel point falls within the preset compression threshold range, compressing the certain target pixel point using a way with a difference value involved to obtain second point compression data corresponding to the certain target pixel point.

4. The method of claim 3, further comprising:

using a way with the original value involved to compress the reference pixel point corresponding to each target pixel point to obtain third point compression data corresponding to the reference pixel point, wherein compression is not performed on the target pixel point that serves as the reference pixel point.

5. The method of claim 4, wherein the compressing each target pixel point according to the point compression data corresponding to each target pixel point to obtain the image compression data of the target image comprises:

obtaining the third point compression data of the reference pixel point corresponding to each target pixel point, and the first point compression data or the second point compression data corresponding to each target pixel point; and based on the third point compression data, the second point compression data and the first point compression data, compressing each target pixel point and the reference pixel point corresponding to the target pixel point to obtain the image compression data of the target image.

6. The method of claim 4, wherein data length of the second point compression data is less than data length of the first point compression data.

7. The method of claim 4, wherein data length of the second point compression data is less than data length of the third point compression data.

8. The method of claim 3, wherein the highest bit of any of the point compression data is used as a compression flag bit for indicating whether compression is activated or not.

9. An image compression apparatus, comprising:
a processor; and
a storage connected with the processor, the storage storing a program executable by the processor to execute a method, the method comprising:

obtaining a target image, and determining a reference pixel point corresponding to each target pixel point in the target image;

determining a pixel difference value between the target pixel point and the reference pixel point corresponding to the target pixel point for each target pixel point;

determining point compression data corresponding to each target pixel point according to the pixel difference value corresponding to each target pixel point; and compressing each target pixel point according to the point compression data corresponding to each target pixel point to obtain image compression data of the target image;

wherein the determining the reference pixel point corresponding to each target pixel point in the target image comprises:

selecting the target pixel point in the first column of each row from the target image as the reference pixel point of remaining target pixel points in that row; or selecting the target pixel point in the first row of each column from the target image as the reference pixel point of remaining target pixel points in that column; or selecting any target pixel point from the target image as the reference pixel point of remaining target pixel points.

10. The image compression apparatus of claim 9, wherein the determining the pixel difference value between the target pixel point and the reference pixel point corresponding to the target pixel point for each target pixel point comprises:

for each target pixel point, obtaining pixel values of the target pixel point and the reference pixel point corresponding to the target pixel point; and subtracting the pixel value of the reference pixel point corresponding to the target pixel point from the target pixel point to obtain the pixel difference value corresponding to the target pixel point.

11. The image compression apparatus of claim 10, wherein the determining the point compression data corresponding to each target pixel point according to the pixel difference value corresponding to each target pixel point comprises:

comparing the pixel difference value corresponding to each target pixel point with a preset compression threshold range;

if the pixel difference value of a certain target pixel point does not fall within the preset compression threshold range, compressing the certain target pixel point using a way with an original value involved to obtain first point compression data corresponding to the certain target pixel point; and if the pixel difference value of a certain target pixel point falls within the preset compression threshold range, compressing the certain target pixel point using a way with a difference value involved to obtain second point compression data corresponding to the certain target pixel point.

12. The image compression apparatus of claim 11, wherein the method further comprises:

using a way with the original value involved to compress the reference pixel point corresponding to each target pixel point to obtain third point compression data corresponding to the reference pixel point, wherein compression is not performed on the target pixel point that serves as the reference pixel point.

13. The image compression apparatus of claim 12, wherein the compressing each target pixel point according to the point compression data corresponding to each target pixel point to obtain the image compression data of the target image comprises:

obtaining the third point compression data of the reference pixel point corresponding to each target pixel point, and the first point compression data or the second point compression data corresponding to each target pixel point; and based on the third point compression data, the second point compression data and the first point compression data, compressing each target pixel point and the reference pixel point corresponding to the target pixel point to obtain the image compression data of the target image.

14. The image compression apparatus of claim 12, wherein data length of the second point compression data is less than data length of the first point compression data.

15. The image compression apparatus of claim 12, wherein data length of the second point compression data is less than data length of the third point compression data.

16. The image compression apparatus of claim 11, wherein the highest bit of any of the point compression data is used as a compression flag bit for indicating whether compression is activated or not.

17. A non-transitory computer-readable storage medium, storing an image compression program, which is executed by a processor to perform the steps of:

obtaining a target image, and determining a reference pixel point corresponding to each target pixel point in the target image;

for each target pixel point, determining a pixel difference value between the target pixel point and the reference pixel point corresponding to the target pixel point;

determining point compression data corresponding to each target pixel point according to the pixel difference value corresponding to each target pixel point; and compressing each target pixel point according to the point compression data corresponding to each target pixel point to obtain image compression data of the target image;

wherein the determining the reference pixel point corresponding to each target pixel point in the target image comprises:

selecting the target pixel point in the first column of each row from the target image as the reference pixel point of remaining target pixel points in that row; or selecting the target pixel point in the first row of each column from the target image as the reference pixel point of remaining target pixel points in that column; or selecting any target pixel point from the target image as the reference pixel point of remaining target pixel points.

* * * * *